G. LAKE.
HYGIENIC HOT PLATE.
APPLICATION FILED MAY 11, 1914.
1,158,135.
Patented Oct. 26, 1915.
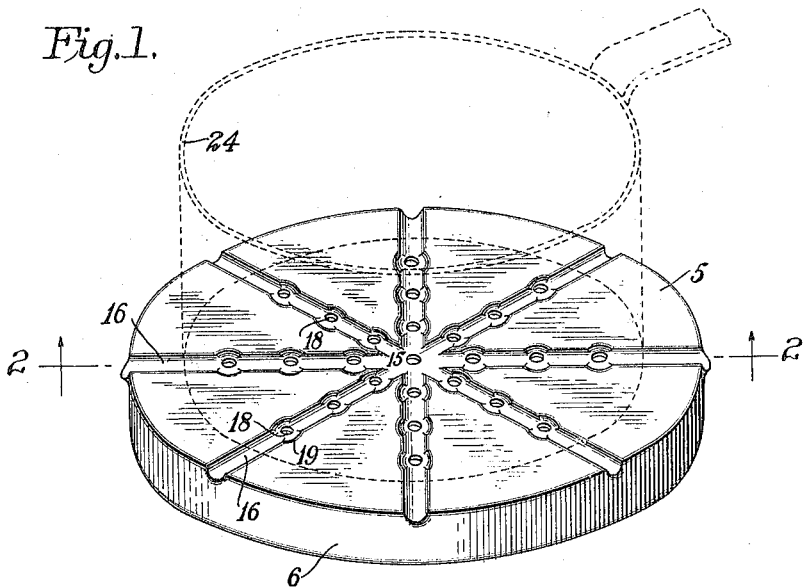
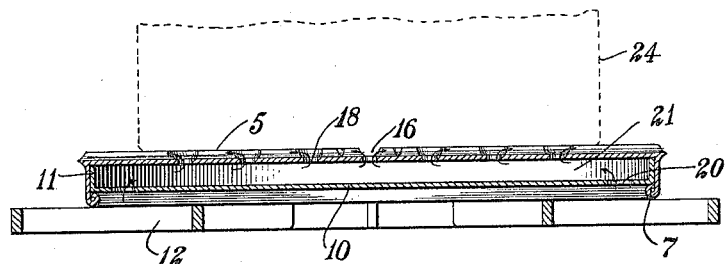
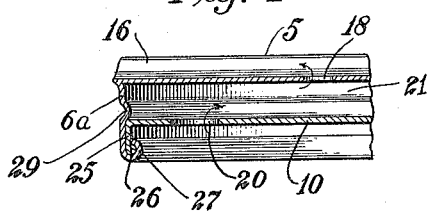
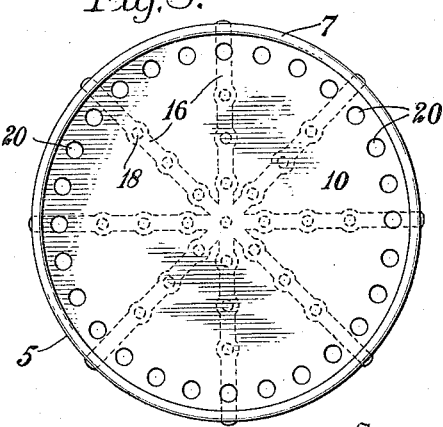
Witnesses:
J. Frederic Cherry
Justin W. Macklin
Inventor
Golladay Lake
By his Attorney
Albert N. Baker
COLUMBIA PLANOGRAPH CO., WASHINGTON, D. C.

UNITED STATES PATENT OFFICE.

GOLLADAY LAKE, OF NEW YORK, N. Y.

HYGIENIC HOT-PLATE.

1,158,135.  Specification of Letters Patent.  Patented Oct. 26, 1915.

Application filed May 11, 1914. Serial No. 837,628.

*To all whom it may concern:*

Be it known that I, GOLLADAY LAKE, a citizen of the United States, residing at New York, in the county of New York and State of New York, have invented a certain new and useful Improvement in Hygienic Hot-Plates, of which the following is a full, clear, and exact description, reference being had to the accompanying drawings.

This invention comprises a device for effectively distributing heat under a cooking utensil to be used on cooking stoves and the like.

An object of the invention is to provide such a device which shall be very efficient in operation and which can be easily manufactured from pressed sheet metal.

Another object is to provide a heat distributer which shall act as a crematory to burn the by-products of combustion beneath the distributer.

Another object is to so construct the distributer as to allow free circulation of the heated gases through it, causing them to be evenly distributed over the bottom of the cooking utensil, at the same time allowing them to pass freely through the distributer and be cremated while the utensil is in place thereon.

Another object is to prevent the waste of heat at the base of the burner.

My invention is hereinafter more fully described in connection with the drawings and the essential characteristics set forth in the claims.

Figure 1 is a perspective view of my device on which a cooking utensil is indicated in broken lines; Fig. 2 is a central vertical section taken substantially on the line 2—2 of Fig. 1; Fig. 3 is a bottom plan of the distributer; Fig. 4 is a vertical section of a portion of the edge of the plate showing a modified construction on an enlarged scale.

Referring to the parts by numerals; 5 indicates a plate made of sheet metal having a substantially flat top surface and a downwardly turned skirt 6 forming a vertical wall for a chamber-like space beneath the plate and having at its lower edge an inwardly curled bead 7. A second sheet metal plate 10 is provided inside the skirt 6 and beneath the plate 5 and has an upwardly turned flange 11 fitting the inside of the skirt. The periphery of the plate rests upon the bead 7, being secured in place thereby. The heat distributer normally rests upon the bead 7 which brings the plate 10 above the top of the stove or gridiron, indicated at 12, or other support on which the distributer may rest, providing a chamber-like space beneath the plate 10.

At the center of the plate 5 is formed a depression 15, from which radiate flues or grooves 16 communicating with this central depression and extending to the outer edge of the plate. The depression 15 and the grooves 16 are formed by pressing them into the plate while it is being formed. In the bottom of the grooves is made a series of openings 18 adapted to allow the heated air and gases to pass through the plate and out along the grooves, beneath a cooking utensil setting on the plate. The grooves are preferably widened slightly around the openings 18 as shown at 19. It will be noted that the upper edge of the flange 11 abuts the under side of the groove portions 16, thereby holding the plate 10 against upward movement.

In the modified form shown in Fig. 4, the plate 10 is provided with a downwardly turned flange 25, formed with a small bead 26, and the skirt 6ª into which this flange fits, is curled around the small bead 26, as shown at 27. The plate 10 may be further prevented from upward movement by providing an inwardly pressed annular bead 29 in the skirt 6ª, this bead being just above the edge of the plate 10.

Around the outer edge of the plate 10, adjacent the flange 11 are made openings 20 allowing the heated air and gases to pass upwardly from beneath the plate 10 into the chamber 21, between the plates 10 and 5.

In operation, the cooking utensil 24 (indicated in broken lines in Fig. 1) is placed upon the upper part of the distributer which is standing on the stove or over a suitable burner, the heated air and gases come up against the under side of the plate 10 and spread outwardly to the periphery of the distributer, but are prevented from escaping beneath the distributer by the portion of the skirt extending below the plate 10. From beneath this plate 10 they pass upwardly through the openings 20, as indicated by the arrows, into the chamber 21, where they are retained a sufficient length of time to allow the poisonous products of combustion to be entirely consumed. From the chamber 21, the heated harmless air and gases pass upwardly through the openings 18 into the grooves 16 and outwardly to the edge of the receptacle, where they escape. In addition to insuring the by-products of combustion being thoroughly burned, the chamber 21 acts as an accumulative chamber for the heat, which is thereby evenly distributed beneath the plate 5, so that the cooking utensil is well heated throughout the bottom, from contact with this plate as well as by the hot air and gases in the grooves.

The grooves 16 act as flues and produce a continuous draft through the distributer, bringing the heated gases away from the center to the outer edge of the cooking utensil and allowing them to act efficiently. This also facilitates delicate cooking, in that excessive heat in the form of a blaze, cannot play on the cooking utensil, and the superfluous heated gases may pass out of these flues.

It will be seen from the foregoing description that I have provided a distributer well adapted for many uses, having two compartments for the heated air and gases, by which I accomplish the objects set forth and which may be said to be hygienic, as it does not allow the poisonous products of combustion to escape into the room, but entirely consumes them before they escape from the flues 16.

Although I have shown and described a particular form of hot plate, embodying my invention, it is to be understood that other modified forms may be used without departing from the spirit of my invention.

What I claim is:

1. A heating device comprising a substantially flat upper and a lower plate spaced apart, an edge wall connecting said plates, a supporting wall projecting beneath the lower plate adapted to form a baffle, depressed radial grooves in the upper plate having openings through the plate at the bottom of the grooves, and an annular row of openings through the bottom plate adjacent the supporting wall, said openings being out of vertical alinement with the first mentioned openings.

2. A heat distributing device comprising an upper plate and a lower plate spaced therefrom, an edge wall formed on the upper plate and extending downwardly beneath the lower plate and having an inturned bead to hold the lower plate, an annular row of openings adjacent the edge of the lower plate, depressed radial grooves formed in the upper plate and extending to the outer edge thereof, and openings through the upper plate in these grooves materially within the zone of the annular row of openings.

3. A heat distributing device comprising sheet metal upper and lower plates spaced apart, an edge wall formed integral with the upper plate and extending downwardly beneath the lower plate forming an annular baffle and having an inturned bead to hold the lower plate, a flange formed on the lower plate engaging said wall, an annular row of openings adjacent the edge of the lower plate, depressed radial grooves formed in the upper plate and extending to the outer edge thereof, and openings through the upper plate in these grooves.

4. In a heating device comprising upper and lower plates spaced apart, an edge wall connecting said plates and an annular baffle formed around the outside edge of the lower plate, an annular row of openings through the lower plate adjacent this baffle, outwardly extending grooves in the upper plate, and openings through the upper plate in said grooves arranged in a central zone, whereby heated gases are deflected by said baffle and caused to pass through said annular row of openings and then toward the center of the plates between the same, then upwardly through the openings in the upper plate and outwardly along said grooves.

5. In a heating device, the combination of upper and lower plates spaced apart, an edge wall connecting said plates, an annular baffle formed around the space below the lower plate, an annular row of openings through the lower plate adjacent to this baffle, the intermediate portion of the lower plate being impervious, radial depressions in the upper plate, and openings through the upper plate in such depressions.

In testimony whereof, I hereunto affix my signature in the presence of two witnesses.

GOLLADAY LAKE.

Witnesses:
H. L. CADMUS,
R. KISSEN.